US006663818B2

(12) United States Patent
Statham et al.

(10) Patent No.: US 6,663,818 B2
(45) Date of Patent: Dec. 16, 2003

(54) LIPSTICK MACHINE

(75) Inventors: Michael Statham, Wootton (GB); Liam Anthony Murray, Monroe, CT (US)

(73) Assignee: Conopco, Inc., New York, NY (US)

( * ) Notice: Subject to any disclaimer, the term of this patent is extended or adjusted under 35 U.S.C. 154(b) by 100 days.

(21) Appl. No.: 09/811,747

(22) Filed: Mar. 19, 2001

(65) Prior Publication Data
US 2002/0130442 A1 Sep. 19, 2002

Related U.S. Application Data
(60) Provisional application No. 60/223,885, filed on Aug. 9, 2000.

(51) Int. Cl.[7] .......................... B29C 39/04; B29C 41/22; A45D 40/16
(52) U.S. Cl. ...................... 264/443; 264/40.1; 264/246; 264/297.7; 264/328.1; 264/328.8; 249/117; 249/119; 425/174.2; 425/257; 425/261; 206/581
(58) Field of Search ................................. 264/443, 442, 264/40.1, 328.1, 328.8, 246, 297.7; 425/DIG. 32, 803, 174.2, 257, 261; 401/DIG. 1; 206/568, 575, 581; 249/112, 119, 170

(56) References Cited

U.S. PATENT DOCUMENTS

| 3,978,568 | A |   | 9/1976  | Frydlender |
|-----------|---|---|---------|------------|
| 4,871,262 | A |   | 10/1989 | Krauss et al. |
| 5,163,010 | A |   | 11/1992 | Klein et al. |
| 5,182,053 | A |   | 1/1993  | Creasman et al. |
| 5,622,692 | A |   | 4/1997  | Rigg et al. |
| 5,780,018 | A |   | 7/1998  | Collins et al. |
| 5,903,465 | A | * | 5/1999  | Brown .................. 364/479.12 |
| 5,971,351 | A | * | 10/1999 | Swaab ........................ 249/117 |
| 6,177,093 | B1|   | 1/2001  | Lombardi et al. |

FOREIGN PATENT DOCUMENTS

| DE | 1 279 318      | * | 10/1968 |
|----|----------------|---|---------|
| DE | 37 27 187 A1   | * | 2/1989  |
| DE | 4110299        |   | 3/1991  |
| EP | 0 578 179 A1   | * | 1/1994  |
| EP | 0 686 468 A1   | * | 12/1995 |
| FR | 2 737 395      |   | 8/1995  |
| JP | 58-81119       | * | 5/1983  |
| KR | 1997-69012     |   | 1/1997  |
| WO | 98/30189       |   | 7/1998  |

OTHER PUBLICATIONS

International Search Report.
Abstracts of Japan—Publication # 63275511—Nov. 14, 1988.
Abstracts of Japan—Publication # 0327406—Dec. 27, 1991.

* cited by examiner

*Primary Examiner*—Stefan Staicovici
(74) *Attorney, Agent, or Firm*—Milton L. Honig

(57) ABSTRACT

An apparatus, mold assembly and related method for manufacturing a personalized lipstick is described, the apparatus including a housing or cabinet, a plurality of different color blends each held within a separate pot fitted with a dispensing system, an ultrasonic wave heating/mixing probe, a mold assembly held within the probe and a transport rail for moving the probe from one station to another within the housing. The lipstick mold assembly includes a sheath containing a solidified base wax formed with a well for receiving color pigments. The method for molding the lipstick includes use of the aforementioned apparatus, providing the mold assembly with a solidified wax, transporting the mold assembly to dosing positions for receiving programmed amounts of the color blends, applying an ultrasonic wave to heat and blend the wax/dosed color blends, transporting the mold assembly within the housing to a cooling station, returning the mold assembly to an operator for demolding and assembling into a suitable lipstick case.

8 Claims, 8 Drawing Sheets

LIPSTICK MACHINE

This application claims the benefit of provisional application No. 60/223,885 filed on Aug. 9, 2000.

BACKGROUND OF THE INVENTION

1. Field of the Invention

The invention concerns an apparatus and method for producing individualized lipsticks and is sufficiently miniature to be operated within retail stores at point-of-sale.

2. The Related Art

Color is highly important to a consumer when considering purchase of a lipstick. Retail outlets often stock only a limited range of shades for any particular color family. Customers can become frustrated with the limited choice. Catalog shopping or purchase from the Internet are alternative solutions. Yet the published colors may in actuality be shades different from their pictorial. Lighting conditions also may adversely effect such election.

Not only retailers but also catalog sales outlets may be hesitant at maintaining extensive lipstick inventory. Fashion is highly volatile. Today's demand may quickly be gone. It is difficult to stay ahead of the consumer. The trade is sensitive to building stock which may become excess. Better solutions are required which cater both to customer and vendor.

Several patents have been published describing systems capable of surmounting at least some of these problems. U.S. Pat. No. 5,622,692 (Rigg et al.), U.S. Pat. No. 4,871,262 (Krauss et al.), German Patent 41 10 299 (Erdtmann) and WO 98/30189 (Stewart) all disclose cosmetic formulation apparatuses and related methods which can individualize products for a customer, especially at the point of sale. U.S. Pat. No. 5,163,010 (Klein et al.) discloses an apparatus primarily directed at customizing hair compositions through a salescounter sized machine.

Lipsticks are much more difficult to formulate than cosmetic creams or lotions. Waxes and certain other indispensable ingredients are semi-solid at room temperature. Mixing presents a challenge. U.S. Pat. No. 5,780,018 (Collins et al.) is one of the earliest disclosures of an apparatus and process to manufacture lipstick in a retail environment. The process involves use of colored pellets in combination with an oil blend mixed under heat resulting in a homogeneous base composition. Molten base is then poured into a molding block. The system appears suitable for limited scale manufacture but not for production of single sticks.

Korean patent application 1997-69012 discloses a lipstick auto-manufacturing machine wherein molten components are injected into a movable molding member through a series of injection ports disposed lengthwise along the path of travel for the molding member. While the machine has been described as more efficient and less complicated than large conventional ones, the system is still not of a size appropriate for point-of-sale operation or for producing product in limited quantities.

U.S. Pat. No. 5,971,351 (Swaab) describes a more retail friendly system for custom blending and fabricating lipstick to the specific demands of individual customers. A kit is provided including a graduated measuring sheet, pigments, bases, additives, a mixing tool, heating vessel, mold assembly and lipstick cases. Measured ingredients are blended together and deposited into a heating vessel containing a base formula. A microwave oven provides a heat source for melting the charge. A problem with this system is that it is neither automated nor highly accurate in reproducibility.

Accordingly, it is an object of the present invention to provide a lipstick manufacturing apparatus and related method which can within several minutes produce a lipstick individualized to the color preferences of a customer.

Another object of the present invention is to provide a lipstick manufacturing apparatus and related method with equipment sized for operation in a retail establishment or for low volume wholesale production.

Still another object of the present invention is to provide a lipstick manufacturing apparatus and related method which allows a customer to select a color shade which information can be transmitted to the apparatus for immediate production of a matching shade lipstick.

These and other objects of the present invention will become more readily apparent from consideration of the following summary and detailed description.

SUMMARY OF THE INVENTION

An apparatus is provided for molding an individualized lipstick, the apparatus including:
- (i) a housing;
- (ii) a plurality of different color blends each held in a separate pot fitted with a delivery conduit;
- (iii) a heating probe within the housing;
- (iv) a mold held within the heating probe for receiving selected amounts of the different color blends via the delivery conduits;
- (v) a transport device allowing the probe with mold to travel within the housing; and
- (vi) an ultrasonic wave generating device delivering ultrasonic waves to the mold for heating contents therein.

In a second aspect of the invention, a method is provided for molding an individualized lipstick particularly at point-of-sale, the method including the steps of:
- (a) providing an apparatus which includes:
  - (i) a housing;
  - (ii) a plurality of different color blends each held in a separate pot fitted with a delivery conduit;
  - (iii) a heating probe within the housing;
  - (iv) a mold held within the heating probe;
  - (v) a transport device allowing the heating probe with mold to travel within the housing; and
  - (vi) an ultrasonic wave generating device delivering ultrasonic waves to the mold for heating contents therein;
- (b) charging the mold with a solidified wax either before or after placing the mold within the probe;
- (c) transporting the probe with mold to a dosing position;
- (d) dosing the mold with at least one of the plurality of different color blends; and
- (e) optionally delivering to the mold a liquid oil prior to dosing the at least one of the plurality of different color blends.

Components of the lipstick such as the waxes, oils and color blends are thoroughly and sufficiently mixed by the ultrasonic agitation. Separate mechanical mixing devices may be deployed but are unnecessary in the context of the preferred embodiment. Indeed, ultrasonic wave application avoids the need to deploy a mixing device separate from the heating system. Ultrasonic waves simultaneously heat and homogenize the lipstick ingredients. Samples can therefore be prepared rapidly.

The preferred embodiment will include a replaceable mold assembly within the mold. The assembly will include:

(i) an elongate plastic sheath with a receiving space therein and with an open and a closed end, the plastic forming the sheath being capable of transmitting an ultrasonic wave in a range from about 15 to 100 KHz, preferably in a range from about 20 to about 50 KHz; and (ii) a wax base composition solid at room temperature charged to fill no more than about 80% by volume of the plastic sheath and preferably without red or brown pigment present.

Advantageously the plastic sheath is formed of a polyacetal which transmits ultrasonic waves, in an efficient manner yet under controlled conditions does not weld, distort or embrittle the assembly. Typically the sheath includes an upper elongate member encompassing a closed end and a lower member surrounding an open end of the sheath. These members are held together by an interference fit. The lower member includes a locking mechanism for engagement into a holder component of a typical retractable lipstick case. The locking mechanism includes an internal ring for gripping an inner surface of the lower member. It is important for best results that the horn assembly mold cavity has an inner surface closely matched in shape with an outer surface of the sheath.

A useful feature of the sheath is a tapered wall. Quick release from the receiving space is obtained through this taper. Otherwise a vacuum effect would act against demolding and cause scoring damage to the lipstick surface.

Correct color is achieved through dosing into the sheath of the mold assembly at least two different color blends, each of the blends being held in separate pots. The dosing occurs as the mold moves along a transport device stopping at different points below respective delivery conduits. Most preferred is that the color blend utilized in smallest amount be dosed first to the mold assembly. Those colors which are dosed in larger amounts may be dosed later.

The reason for the smallest color blend to be dosed first is so the critical color is at a lowest point within the receiving space of the sheath. Most of the ultrasonic energy is concentrated at that point and thereby ensures good mixing. Movement of the mold assembly to collect different color blends in contrast to bundling all delivery conduits into a single position is preferred because mold assembly openings are relatively small. Narrow openings ensure that in mixing, none of the blend escapes through splash.

Advantageously each sheath is provided with a hard base wax partially filling the receiving space. The partial fill may range from about 10 to about 80%, preferably from about 30 to about 60%, optimally about 40 to about 55% of volume of the sheath. Best practice is to initially dose a charge of liquid oil such as castor oil directly on top of the hard wax base. Thereafter various of the color blends are charged to the receiving space, in a sequence and amount corresponding to a chosen final lipstick color. Alternatively the liquid oil and color blends from the pots may be simultaneously dosed. The term "hard wax" is meant to define a wax or wax mixture solid at room temperature. The term "liquid oil" is meant to define a hydrophobic ester or hydrocarbon liquid at room temperature.

A variety of transport devices are envisioned for the invention. Most preferred is a rail system which may either travel along a straight rail path or be on a carousel for circular movement within the housing. Alternative transport devices include turntables and robotic arms extendable through pivot joints throughout an internal area of the housing.

In the method, cooling of the ultrasonically mixed and heated lipstick blend is begun by moving the probe carrying the mold assembly along its rail into a cooling chamber. A solid state cooling device is applied to the mold assembly while still held within the probe and while the sheath and contents are initially hot. Natural convection allows the processed blend to rapidly cool but without distortion of the surface of shape of the lipstick.

At the point-of-sale, a customer selects a color. Choices may be taken from a set of color cards or some colored item the customer may wish to match. Dresses, handbags, hair, nail polish or the like may represent the color prototype. A spectrophotometer may be employed to evaluate the selected color. Information on the measured color such as L*a*b values are then transmitted to a memory device. Measured values are correlated with one of a set of pre-programmed color formulas. The matching formula is then generated by activating appropriate ones of the color blend pots and dispensing the blends to achieve the desired lipstick color. Alternative to measurement by spectrophotometer, the customer's selection can be manually input to the memory device as a recognized color for translation into the matching lipstick.

BRIEF DESCRIPTION OF THE DRAWING

Further objects, features and advantages of the present invention will become more apparent through consideration of the following drawing in which.

DETAILED DESCRIPTION OF THE INVENTION

Figure 1:
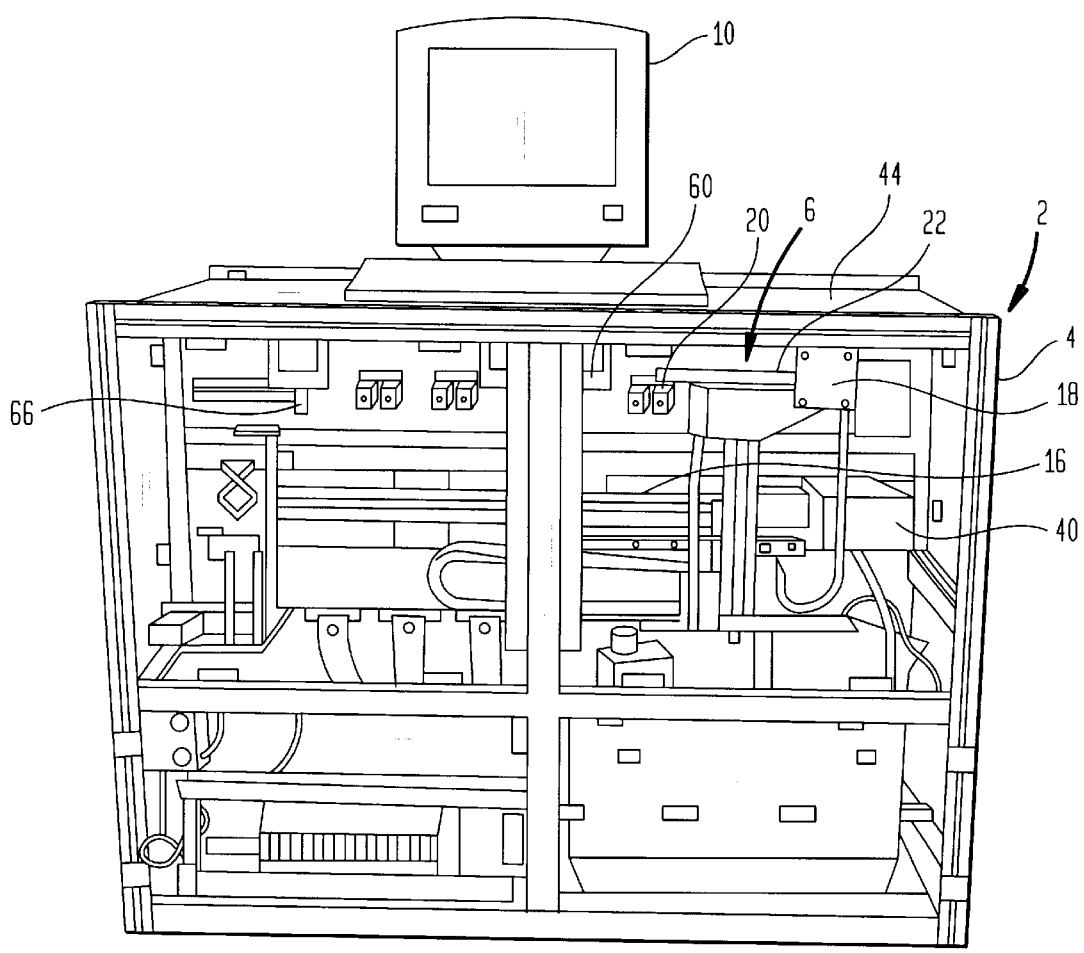
FIG. 1 is a front perspective view of the lipstick apparatus according to the present invention.

Now there has been developed an apparatus 2 for molding individualized lipsticks. FIG. 1 illustrates apparatus 2 encompassed within a housing 4 which approximates in volume an executive office desk. Major systems of the apparatus include an ultrasonic probe 6, a multiple differently colored blend dispensing system 8, a heating station 12, a cooling station 14 and a transport system 16. Movement, color blend dispensing and heating/mixing/cooling are controlled by a memory device 10.

Figure 2:
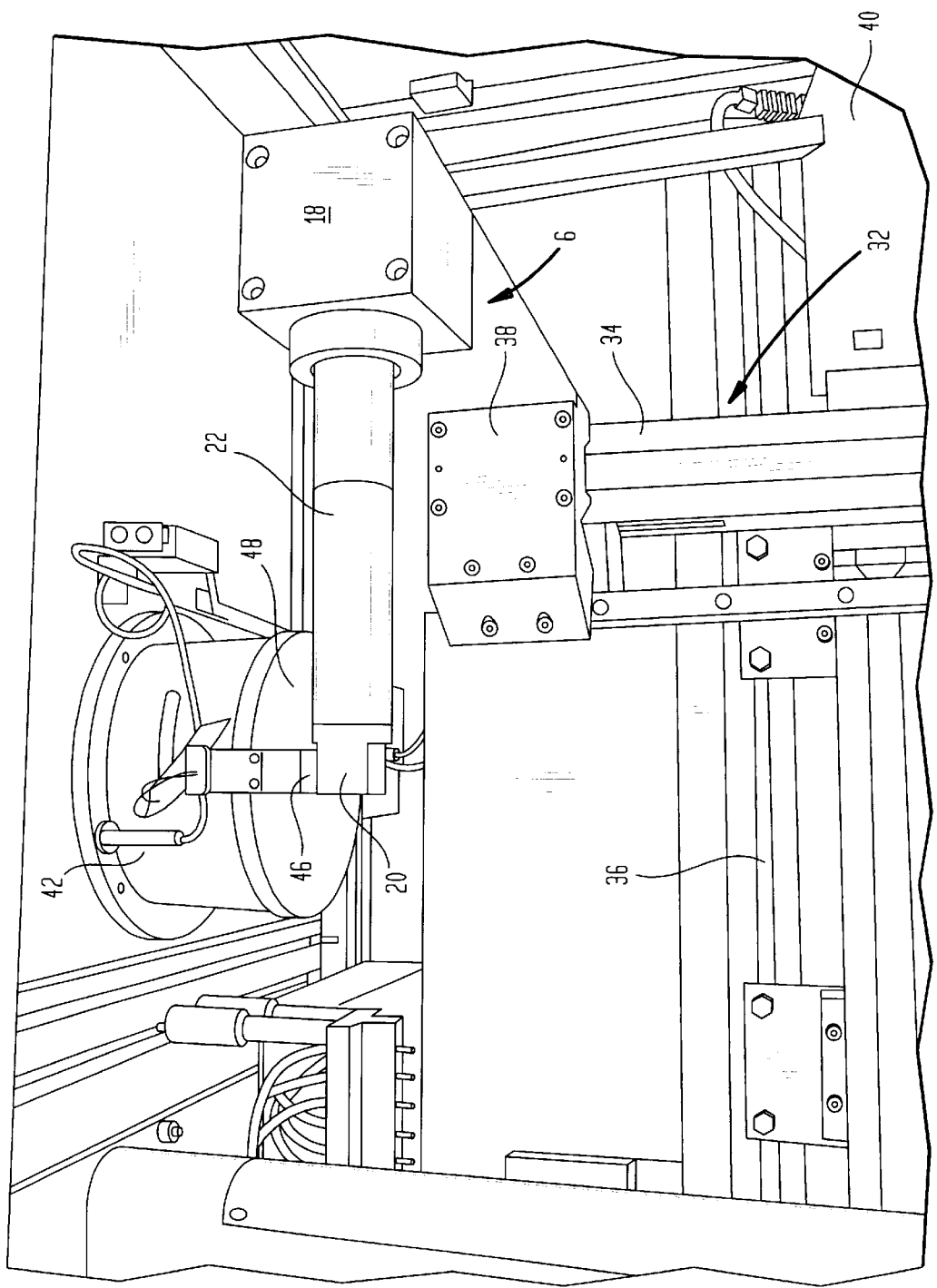
FIG. 2 is a more detailed view of the upper right-hand quadrant of FIG. 1 illustrating an ultrasonic horn assembly in an initial receiving (home) position.

FIG. 2 illustrates in greater detail the ultrasonic probe 6. Among components of the probe 6 are a transducer 18, a sample holder 20 and a tuning horn 22, the latter positioned between the transducer and sample holder. Tuning horn and sample holder together form a horn assembly 23 held together by a set of screws 25. Commercially the transducer is available from Sonic Systems Ltd. in the form of a 20 KHz, 100 watt output unit. For purposes of this invention it may also be appropriate to utilize an ultrasonic wavelength ranging from about 15 KHz to about 100 KHz. Holder 20 includes a mold 17 having a cavity 24 shaped to conform to a mold assembly 26, the latter serving as a lipstick shaping receptacle. Inner walls 28 of the cavity and outer walls 30 of the mold assembly should have a sufficiently high surface finish and complementary shape so as to achieve close contact thereby allowing good ultrasonic energy transfer. The horn assembly is preferably formed by two parts: one being an aluminum alloy end piece and the other a titanium extension. Titanium has good ultrasonic transmission characteristics, also low thermal conducitivity, lending itself to absorb little heat during processing. This greatly reduces the input energy required to heat and cool. In the illustrated embodiment, tuning horn 22 is formed of titanium and sample holder 20 is formed of an aluminum alloy.

Transport of the horn from one system to another within housing 4 is accomplished through a rail assembly 32. This assembly includes a vertical rail 34 and a horizontal rail 36 for respective vertical and horizontal movement. Probe 6 is attached to the rail assembly by a support carriage 38. An electrically powered linear motion assembly 40 operates movement of support carriage 38 in conformance with instructions from the memory device 10.

A receiving dock 42 is positioned in an upper right-hand quadrant of housing 4. Access from outside the housing to the receiving dock is through door 44. One or more mold assemblies 30 are positionable within the receiving dock 42. A receiving port 46 is disposed within a floor 48 of the receiving dock. Sample holder 20 is alignable with receiving port 46 to accept a mold assembly 26.

Figure 3:
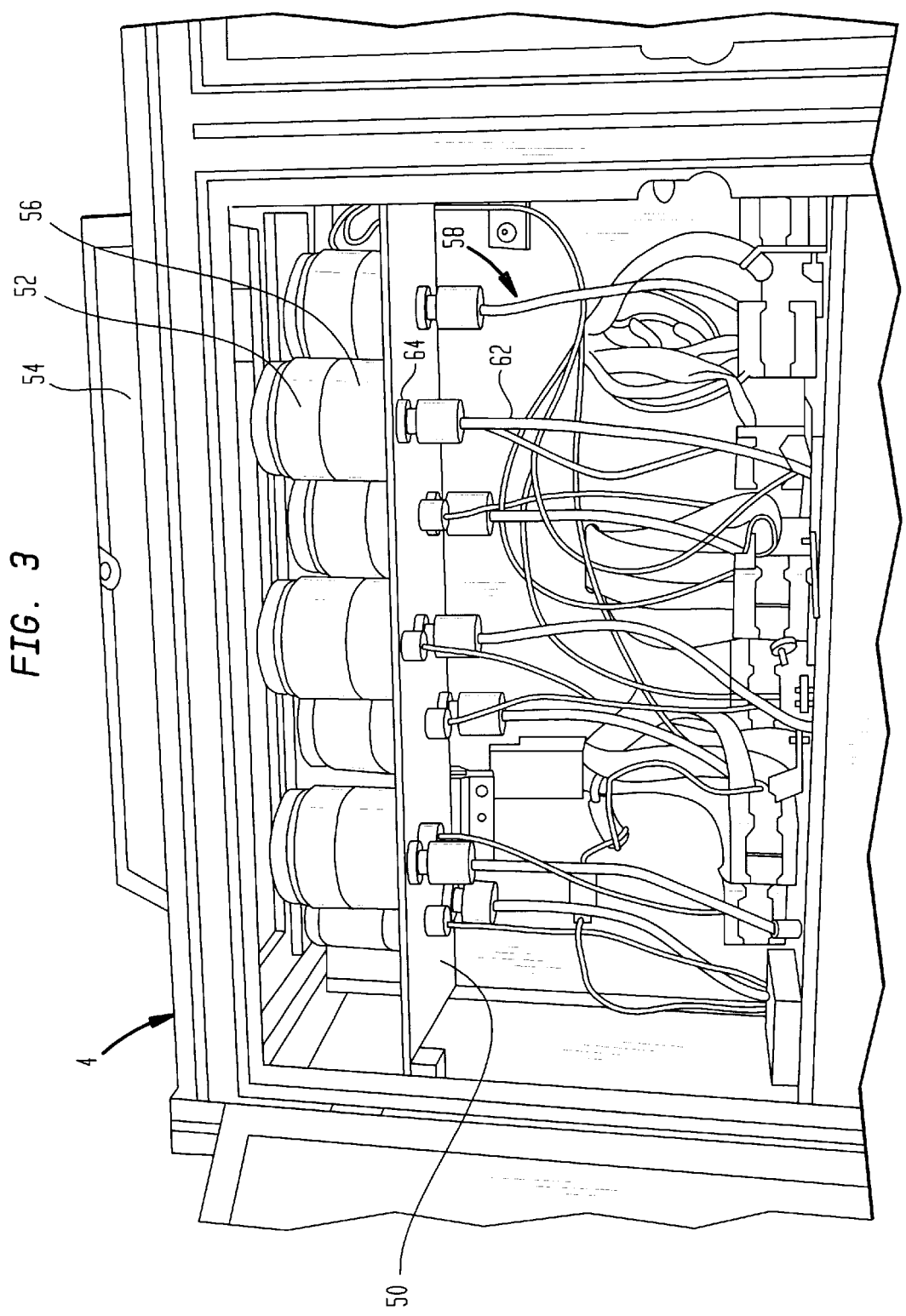
FIG. 3 is a partial view of color blend reservoirs stored in an upper left, rear quadrant area of the apparatus according to claim FIG. 1.
Figure 4:
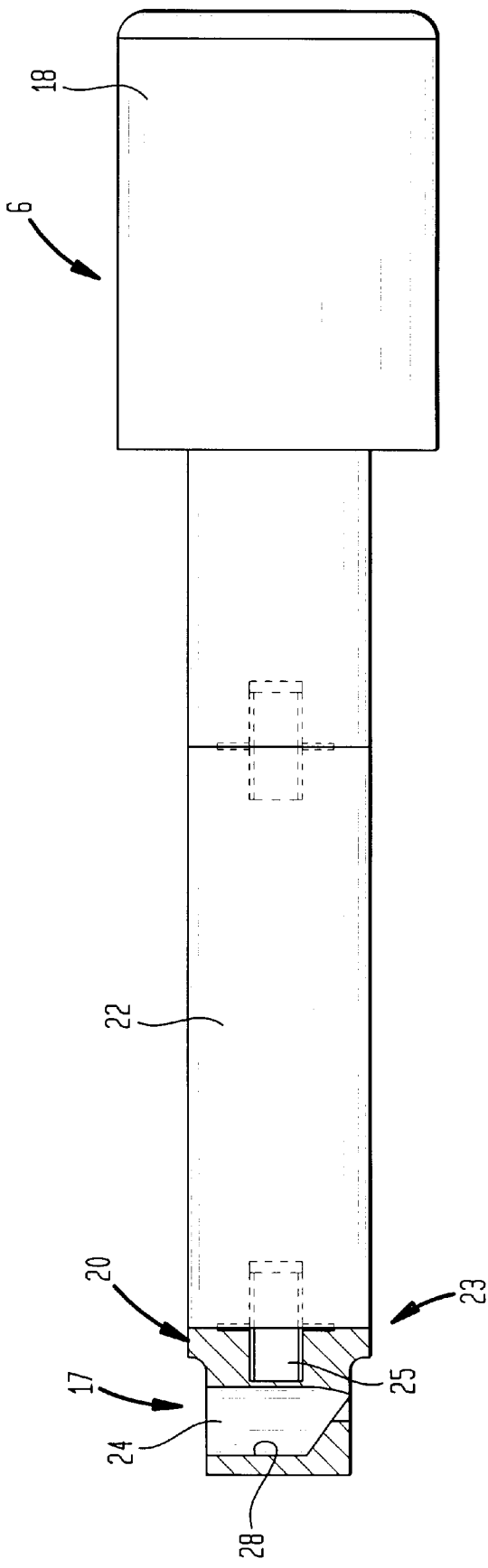
FIG. 4 is a cross-sectional schematic view of the ultrasonic probe employed in FIG. 1.

FIG. 3 illustrates an upper left-hand quadrant of housing 4. Therein a shelf 50 supports a series of color blend pots 52. Access to the pots from outside the housing is through door 54 which allows for periodic refill of the color blend compositions 56. A delivery conduit system 58 connects the pots 52 to a set of respective dispensing pumps which in turn feed a set of respective dispensing nozzles 60. In the preferred embodiment shown, the dispensing nozzles 60 will be fourteen in number, however, the nozzles may range from two to fifty in number. According to the present embodiment it is preferred that the nozzles lie along a line of travel of the support carriage 38. Delivery conduit system 58 includes a set of plastic tubes which are connected to discharge openings in the bottoms of the respective color blend pots 52. A series of pumps dispense amounts of color blend composition flowing from each of the pots for a particular selected sample.

An ultrasonic tensioner 66 is positioned within a left-hand upper quadrant of housing 4. This device ensures the mold assembly is firmly coupled with the probe to heat the ingredients within the mold assembly thereby fluidizing and subsequently thoroughly mixing (homogenizing) the ingredients. Also within the left-hand upper quadrant is a cooling station 68 within which the horn is receivable.

Figure 5:
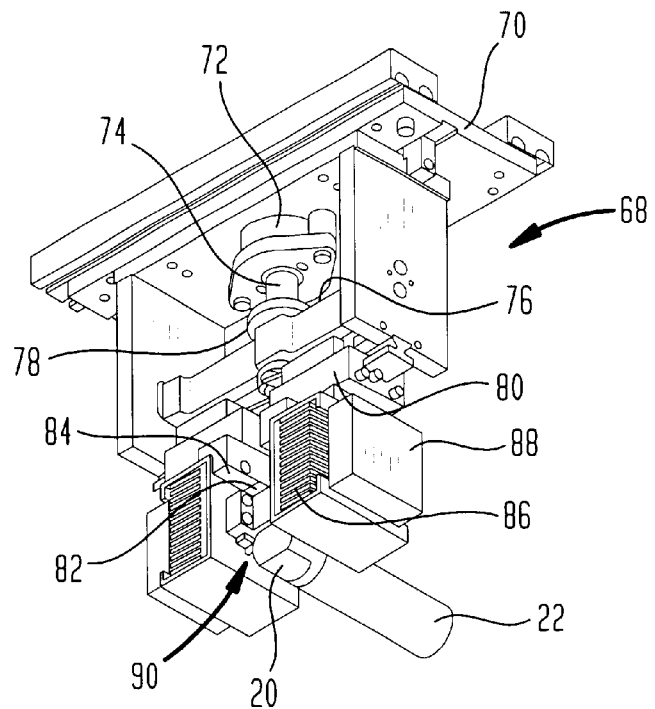
FIG. 5 is a perspective view of the cooler system with engaged ultrasonic horn assembly suspended in the upper left quadrant of the apparatus shown in FIG. 1.

FIG. 5 illustrates in more detail the cooling station 68. A base plate 70 attached to structural beams of the housing supports cooling station 68. Also supported from the base plate are transport control elements including a rotary solenoid 72, coupling 74, connecting rod 76 communicating with the rail assembly, setting knob 78 and a sliding carriage 80 for alignment with the horn 20. A Peltier device 82 adjacent a copper cooling block is nested between insulators 84 and a pair of heat sink coils 86 with cooling fan 88. A cooling harbor 90 for receiving the horn is circumscribed by the heat sink coils, Peltier device and insulators.

Figure 6:
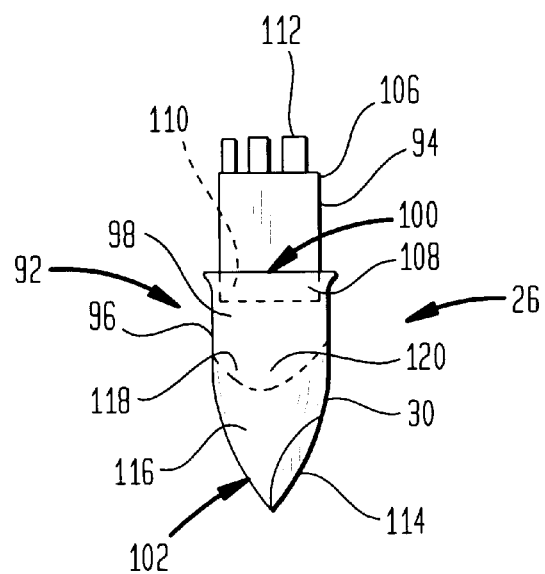
FIG. 6 is a perspective view of a lipstick mold assembly for use with the ultrasonic horn assembly shown in FIG. 4.

FIG. 6 illustrates the mold assembly 26. The assembly includes a sheath 92 with detachable upper and lower members 94 and 96, respectively. A receiving space 98 is formed by walls of the lower member having an open end 100 and a closed end 102. A detent 104 is circumferentially formed near open end 100. Upper member 96 is a hollow cylindrical part with upper and lower ends 106 and 108 respectively. The lower end 108 is circumscribed by a band 110 serving as an interference fit with detent 104 for coupling of the upper to the lower member. A ring of gripping claws 112 is positioned around upper end 106. The gripping claws serve to anchor the lipstick within a lipstick case subsequent to the manufacturing process. Advantageously the outer walls 30 taper slightly inward in a direction from open end 100 toward a junction with oblique face 114 formed near the closed end 102. The slight taper (from about 2 to about 30°, preferably from about 4 to about 10° in angle) allows good mold release from a vacuum situation thereby avoiding scoring damage on surfaces of the manufactured lipstick.

Most advantageous as a material of construction for the sheath is a polyacetal. This type of plastic transmits ultrasonic waves in an efficient manner yet under controlled conditions does not weld, distort or embrittle the assembly.

In the preferred embodiment, the lower member 94 of the mold assembly is charged with a hard wax base 116 prior to the manufacture process within apparatus 2. Levels of wax base in the sheath tower member can range from about 10 to about 80%, preferably from about 30 to about 60% by volume of receiving space 98. Typical components of the hard wax base include: beeswax, ozokerite, carnauba, candelilla, polyethylene waxes and combinations thereof. The hard wax base normally will have a melting point above 10° C., normally above 20° C., but optimally ranging from 40 to 100° C., and most especially from 55 to 65° C.

Advantageously the deposited hard wax base will have an upper surface 118 formed as a well 120 of curvature deeper than a water meniscus within an identical receiving space. The hard wax base as a bottom layer within the receiving space has functional benefit. Injection of castor oil during the manufacture process within the apparatus results in a good liquid-solid coupling interface for ultrasonic heating.

According to the method of this invention, a customer selects a color for the proposed lipstick by presenting the apparatus operator with a desired color. Perhaps this may be a shade of a customer's previous lipstick, a particular shade from a garment, a shade selected from a set of color cards or of any other origin. Various color shades can be presented for selection by the customer on a computer monitor connected with the apparatus memory chip. Alternatively a spectrophotometer can measure the color of the item which the consumer wishes to reproduce as a lipstick or have read from a color card. This information is then fed into the memory of the apparatus for comparison with one of a pre-programmed set of color formulations.

Figure 7A:
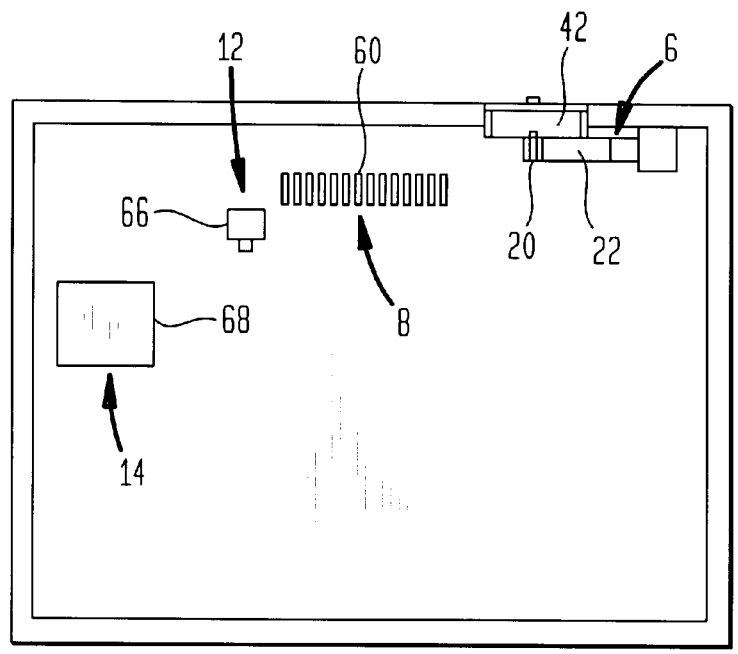
FIG. 7a is a schematic view showing the home (initial) position of the sample holder of the ultrasonic horn assembly in a series demonstrating formation of a lipstick utilizing the apparatus of FIG. 1.
Figure 7B:
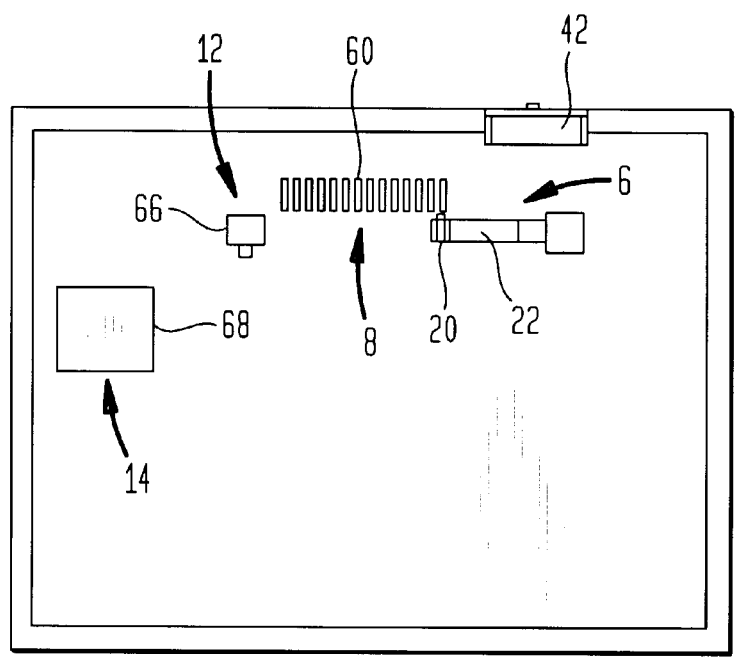
FIG. 7b is a schematic view showing the sample holder positioned below the first of the color blend dispensing nozzles in a series demonstrating formation of a lipstick utilizing the apparatus of FIG. 1.
Figure 7C:
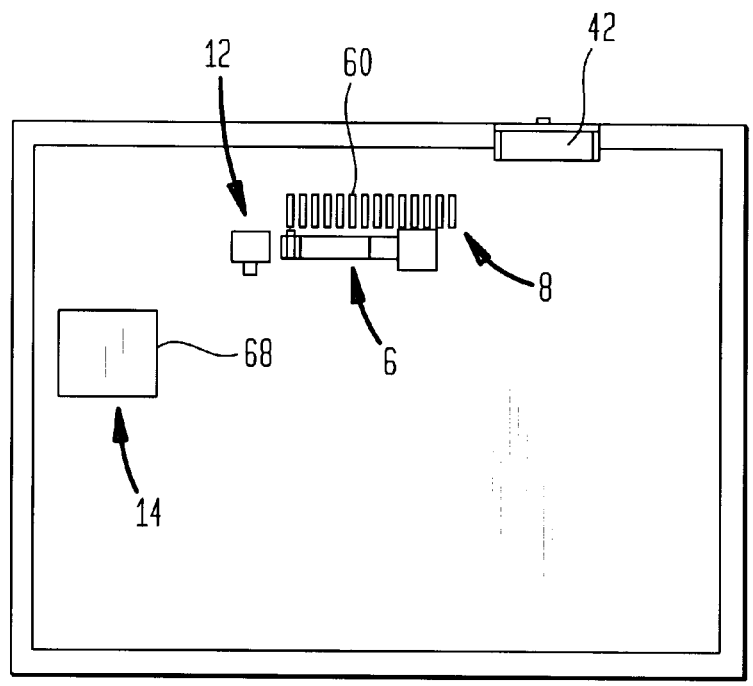
FIG. 7c is a schematic view showing the sample holder positioned below the last of the color blend dispensing nozzles in a series demonstrating formation of a lipstick utilizing the apparatus of FIG. 1.
Figure 7D:
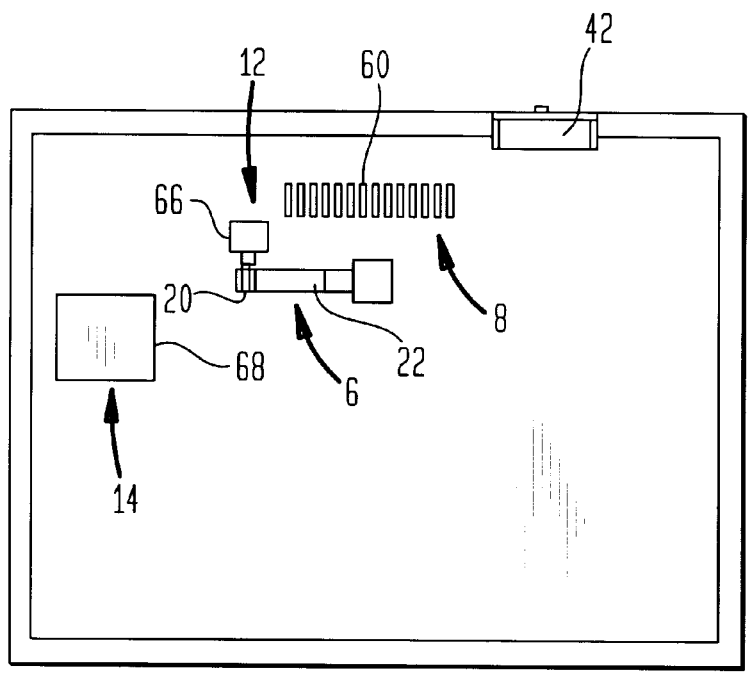
FIG. 7d is a schematic view showing the ultrasonic heating position of the sample holder in a series demonstrating formation of a lipstick utilizing the apparatus of FIG. 1.
Figure 7E:
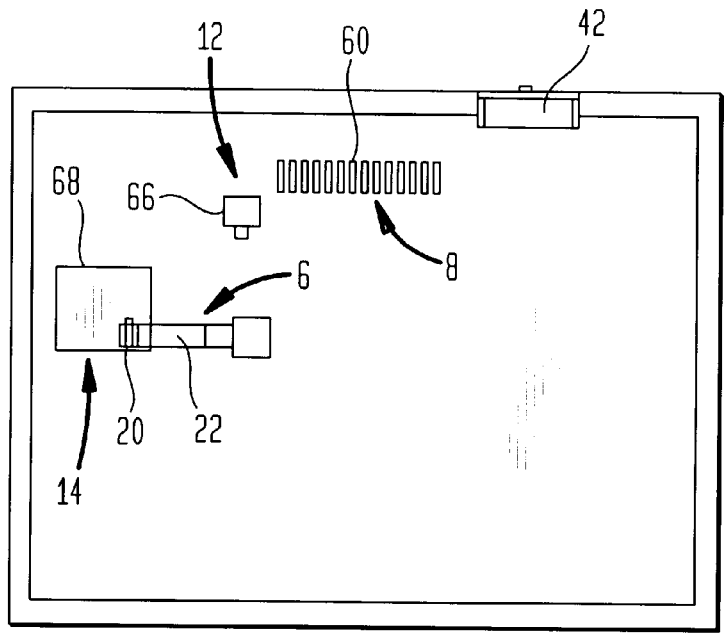
FIG. 7e is a schematic view showing the cooling position of the sample holder in a series demonstrating formation of a lipstick utilizing the apparatus of FIG. 1.
Figure 7F:
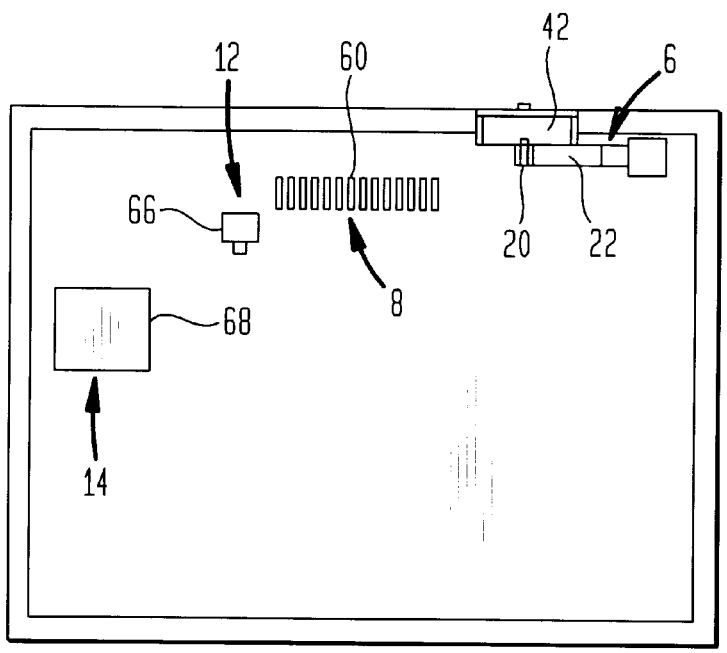
FIG. 7f is a schematic view showing the return (initial) position of the sample holder in a series demonstrating formation of a lipstick utilizing the apparatus of FIG. 1.

FIGS. 7a–f illustrates in schematic sequence the process flow within the apparatus. FIG. 7a represents the home position with the horn of the probe placed directly below the lipstick loading/unloading compartment known as receiving dock 42. A plastic mold assembly partially filled with wax base is loaded into the sample holder 20. The probe with loaded sample holder is then transported to a station beneath dispensing nozzles 60. FIG. 7b illustrates the holder positioned below a first of the dispensing nozzles. Dependent upon the desired color, the program directs positioning of the holder under respective other members of the dispensing nozzle group to dispense particular colorants. At least one of the dispensing nozzles will discharge a liquid oil such as castor oil to aid with homogenization of lipstick ingredients including the hard base wax and pigments from the color dispensing pots 52. FIG. 7c illustrates the holder as it has sequentially moved to the last of the dispensing nozzles. Lipstick ingredient contents of the mold assembly are then heated and mixed at the ultrasonic tensioner 66. FIG. 7d illustrates the holder placed directly beneath the ultrasonic tensioner. The tensioner's purpose is to ensure the mold assembly is held sufficiently firmly in the mold cavity to allow good ultrasonic energy transfer into the product. Once all of the lipstick ingredients have been heated and homogenized under the influence of ultrasonic waves, the holder as shown in FIG. 7e is transported to cooling station 68. Sample holder 20 is placed within the cooling harbor 90 where the sheath 92 is contacted with cooling device 82 for a time sufficient to cool the sheath contents to a temperature which ensures the product may be demolded successfully. Preferably the cool down temperature is between +10° and −10° C. Further, cooling of the sheath occurs through natural convection. FIG. 7f illustrates return to the home position once the probe has been transported from the cooling station back to the receiving dock.

Except in the operating and comparative examples, or where otherwise explicitly indicated, all numbers in this description indicating amounts of material ought to be understood as modified by the word "about".

The foregoing description and examples illustrate selected embodiments of the present invention. In light thereof variations and modifications will be suggested to one skilled in the art, all of which are within the spirit and purview of this invention.

What is claimed is:

1. An apparatus for molding an individualized lipstick, the apparatus comprising:
    (i) a housing;
    (ii) a plurality of different color blends each held in a separate pot fitted with a delivery conduit;
    (iii) a heating probe within the housing;
    (iv) a mold held within the heating probe for receiving selected amounts of the different color blends via the delivery conduits;
    (v) a transport device allowing the heating probe with mold to travel within the housing; and
    (vi) an ultrasonic wave generating device delivering ultrasonic waves to the mold for heating and mixing contents therein.

2. The apparatus according to claim 1 wherein the transport device comprises a rail defining a straight or carousel path.

3. The apparatus according to claim 1 further comprising a cooling station.

4. The apparatus according to claim 1 wherein the mold is fitted with a releasable mold assembly comprising a sheath formed of a plastic that is not embrittled by ultrasonic generated heat.

5. A method for molding an individualized lipstick, the method comprising:
    (a) providing an apparatus comprising:
        (i) a housing;
        (ii) a plurality of different color blends each held in a separate pot fitted with a delivery conduit;
        (iii) a heating probe within the housing;
        (iv) a mold held within the heating probe;
        (v) a transport device allowing the heating probe with mold to travel within the housing; and
        (vi) an ultrasonic wave generating device delivering ultrasonic waves to the mold for heating and mixing contents therein;
    (b) charging the mold with a wax base solid at room temperature;
    transporting the probe with mold to a dosing position; and
    dosing the mold with at least one of the plurality of different color blends.

6. The method according to claim 5 wherein the mold is moved between at least two positions underneath dispensing nozzles for receiving different color blends.

7. The method according to claim 6 wherein dosing is first with a color blend, the color blend being in an amount which is a smallest amount to be dosed for a particular sample.

8. The method according to claim 5 further comprising delivering to the mold a liquid oil prior to dosing the at least one of the different color blends.

* * * * *